(12) United States Patent
Nguyen et al.

(10) Patent No.: US 7,370,156 B1
(45) Date of Patent: May 6, 2008

(54) UNITY PARALLEL PROCESSING SYSTEM AND METHOD

(75) Inventors: Tung M. Nguyen, Cupertino, CA (US); Ram Gupta, Morgan Hill, CA (US); Richard Au, Woodside, CA (US)

(73) Assignee: Panta Systems, Inc., Santa Clara, CA (US)

( * ) Notice: Subject to any disclaimer, the term of this patent is extended or adjusted under 35 U.S.C. 154(b) by 255 days.

(21) Appl. No.: 11/035,642

(22) Filed: Jan. 14, 2005

Related U.S. Application Data (60) Provisional application No. 60/625,344, filed on Nov. 4, 2004.

(51) Int. Cl.
 *G06F 12/00* (2006.01)
 *G06F 13/00* (2006.01)
(52) U.S. Cl. .................. 711/147; 711/100; 711/153; 711/154
(58) Field of Classification Search ................ 711/147, 711/100, 153, 154
 See application file for complete search history.

(56) References Cited

U.S. PATENT DOCUMENTS

| | | | | |
|---|---|---|---|---|
| 6,871,219 | B2* | 3/2005 | Noordergraaf et al. | 709/214 |
| 2002/0016891 | A1* | 2/2002 | Noel et al. | 711/153 |
| 2002/0087813 | A1* | 7/2002 | Harris et al. | 711/148 |
| 2002/0087846 | A1* | 7/2002 | Nickolls et al. | 712/229 |
| 2003/0046511 | A1* | 3/2003 | Buch et al. | 712/1 |
| 2004/0015899 | A1* | 1/2004 | May et al. | 717/140 |
| 2004/0078779 | A1* | 4/2004 | Dutt et al. | 717/106 |
| 2004/0199919 | A1* | 10/2004 | Tovinkere | 718/102 |

OTHER PUBLICATIONS

Cohen, Aaon; Woodring, Mike. Win32 Multithreaded Programming. O'reilly, 1997. Chapter1: pp. 1-8. http://www.oreilly.com/catalog/multithread/excerpt/ch01.htm.*

"Sequent's NUMA-Q SMP Architecture". Sequent Computer Systems, 1997. pp. 1 and 9-13. http://www.parallel.ru/ftp/computers/sequent/NUMA_SMP_REV.pdf.*

Kandemir, Mahmut et al. "Minimizing Data and Synchronization Costs in One-Way Communication". IEEE Transactions on Parallel and Distributed Systems, vol. 11, No. 12, Dec. 2000. pp. 1232-1251.*

Couturier, Raphael et al. "A compiler for parallel Unity programs using OpenMP". Proceedings of the International Conference on Parallel and Distributed Processing Techniques and Applications, 1999. pp. 1992-1998.*

(Continued)

*Primary Examiner*—Tuan V. Thai (57) ABSTRACT

Present invention unity parallel processing systems and methods facilitate flexible utilization of sequential program applications in a distributed multi-computer parallel processing environment. The new unity parallel processing architecture enables multiple processing nodes (e.g., SMPs) to perform multi-thread processing within the multiple processing nodes while providing a shared virtual global memory space. Symmetric multiprocessors run shared memory applications with modified runtime guidance directives that permit the memories to emulate a virtual global memory across the plurality of symmetric multiprocessors. Within each SMP node, programs utilize multiple threads according to directives and library calls. Across multiple SMP nodes, each SMP node is treated as a single process with one-way communication to other SMP nodes. Portions of the program data are stored in memories associated with the SMP nodes and communication of the program data across multiple SMP nodes is controlled by unity compiler directives.

20 Claims, 7 Drawing Sheets

OTHER PUBLICATIONS

OpenMP Fortran Application Program Interface (Version 2.0). 2000. pp. 1-3, 18-19, 25-27, 34-37, and 67. http://www.openmp.org/drupa/mp-documents/fspec20.pdf.*

Calzarossa, Maria. "Processor Allocation in Parallel Systems". IEEE. 1991. pp. 133-137.*

Ismail, Ismail. "Program-Based Static Allocation Policies for Highly Parallel Computers". IEEE. 1995. pp. 61-68.*

* cited by examiner

UNITY PARALLEL PROCESSING SYSTEM AND METHOD

RELATED APPLICATIONS

This application claims the benefit of now abandoned commonly-owned U.S. Patent Provisional Application Ser. No. 60/625,344, filed Nov. 4, 2004, entitled "A UNITY PARALLEL PROCESSING SYSTEM AND METHOD" which is hereby incorporated by this reference.

FIELD OF THE INVENTION

The present invention relates to the field of information processing. More particularly, the present invention relates to a system and method for unity parallel programming.

BACKGROUND OF THE INVENTION

Electronic devices and systems have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data, ideas and trends in most areas of business, science, education and entertainment. These advantageous results are often realized through the use of information processing and the speed at which the information is processed is often critical. Advances in parallel processing system configurations often offer the potential to significantly increase the speed at which the information is processed. However, advances in processing system configurations typically require special complex programs to be written for the new systems.

Traditional information processing applications usually contain specialized information processing instructions. The processing information (e.g., data and instructions) is usually stored in a memory. The configuration of the memory and access to the information is critical for proper implementation of application programs. One type of conventional memory configuration is shared memory. In a shared memory configuration, multiple processors share access to a single pool of memory. This type of processing configuration system is relatively simple and allows programs to be written in a traditional sequential format. A single shared memory controller ensures data consistency between sub processes running on different processors. Conventional parallel compilers can decompose a sequential program to run portions of the program in parallel. For example, a do loop working on an array can be partitioned over multiple processors by a conventional compiler. However, shared memory applications can not typically scale well to large multiple processing systems.

Advances in processor fabrication technology typically support faster processors with greater processing bandwidth at cheaper prices. The faster inexpensive processors enable significant scaling of multiple processor approaches in computer system architectures. For example, clustered computer systems incorporate multiple processing nodes in which each node typically has a processor and an associated memory. The multiple processors and memories in the system offer potentially significant speed increases through distribution and parallelization of sub-process operations.

Numerous applications naturally lend themselves to division into sub-processes suitable for multi-processing architectures such as clusters. For example, applications that search for patterns in large data sets can usually be broken down into multiple searches across subsets of the data. Each sub-problem can be solved independently and the results easily combined. However, many important applications such as modeling of fluid flows and other complex scientific applications are not readily decomposed. These applications often evolve over decades of use and represent major investments. Changes in programming languages, tools, libraries, and models, as well as hardware platform changes, usually involve a significant cost as program software codes are ported and/or rewritten. Traditional attempts at achieving parallelism for these applications often involve large scale and/or distributed systems. However, conventional large scale and/or distributed system approaches often encounter significant coordination and synchronization problems.

Message passing has emerged as a primary programming model used to attempt coordination of various application processing in large scale systems. Message passing attempts to provide high performance on large-scale systems, but usually require significant proper application restructuring. However, inconsistent performance, non-incremental high programming and maintenance costs have limited the advancement and spread of MPI applications. On the other end of the spectrum, shared memory parallelism is often exploited using OpenMP (e.g., C or FORTRAN with extensions to support loop and task parallelism). However, OpenMP is limited to the scalability of the SMP node.

SUMMARY OF THE INVENTION

A unity parallel processing system and method are presented. A present invention unity parallel processing system and method facilitate flexible utilization of sequential program applications in a distributed multi-computer parallel processing environment. The new present invention unity parallel processing architecture enables multiple processing nodes (e.g., SMPs) to individually perform multi-thread programming while providing a shared virtual global memory space and supporting global processing across the multiple processing nodes. In one embodiment of the present invention, a unity parallel processing system includes symmetric multiprocessors (SMPs) and memories which are communicatively coupled to one another by a bus. The components of the unity parallel processing system cooperatively operate to perform parallel programming of sequential programs sharing an emulated virtual global memory space. The symmetric multiprocessors run shared memory applications with modified runtime guidance directives that permit the memories to emulate a virtual global memory across the plurality of symmetric multiprocessors. Access to the virtual global memory space is at the process level. Within each SMP node, programs utilize multiple threads according to directives (e.g., Open MP directives) and library calls. Across multiple SMP nodes, each SMP node is treated as a single process with one-way communication to other SMP nodes. Portions of the program data are stored in memories associated with the SMP nodes and communication of the program data across multiple SMP nodes is controlled by unity compiler directives.

BRIEF DESCRIPTION OF THE DRAWINGS

The accompanying drawings, which are incorporated in and form a part of this specification, illustrate embodiments of the invention by way of example and not by way of limitation. The drawings referred to in this specification should be understood as not being drawn to scale except if specifically noted.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it is understood the present invention may be practiced without these specific details. In other instances, some readily understood methods, procedures, components, and circuits have not been described in detail as not to unnecessarily obscure aspects of the current invention.

Some portions of the detailed descriptions that follow are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here generally conceived to be a sequence of steps or instructions that guide operations of a system to a desired result. The steps include physical manipulations of physical quantities. Usually, though not necessarily, these quantities take the form of electrical, magnetic, optical, or quantum signals capable of being stored, transferred, combined, compared, and otherwise manipulated in a processing system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum computing device), that manipulates and transforms data represented as physical (e.g., electronic) quantities. The terms refer to actions and processes of the processing devices that manipulate or transform physical quantities within a system's components (e.g., registers, memories, other such information storage, transmission or display devices, etc.) into other data similarly represented as physical quantities within the same or other components.

Present invention unity parallel processing systems and methods facilitate utilization of sequential application programs in a parallel multi-processing system architecture. A present invention unity parallel processing environment enables a hybrid sequential/parallel processing model for multi-computer systems in which the multi-computers share a virtual global memory space. In one embodiment of the present invention, the multi-computer systems include symmetrical multiprocessing (SMP) nodes. The unity parallel programming environment is a new run time environment that permits multi-thread programming within individual SMP nodes while providing global process support across multiple SMP nodes. In one exemplary implementation, a sequential program (e.g., in OpenNP) and Data Parallel extensions are merged by adding Data Parallel mapping directives to extend the sequential program application for execution across multiple SMP nodes.

Figure 1:
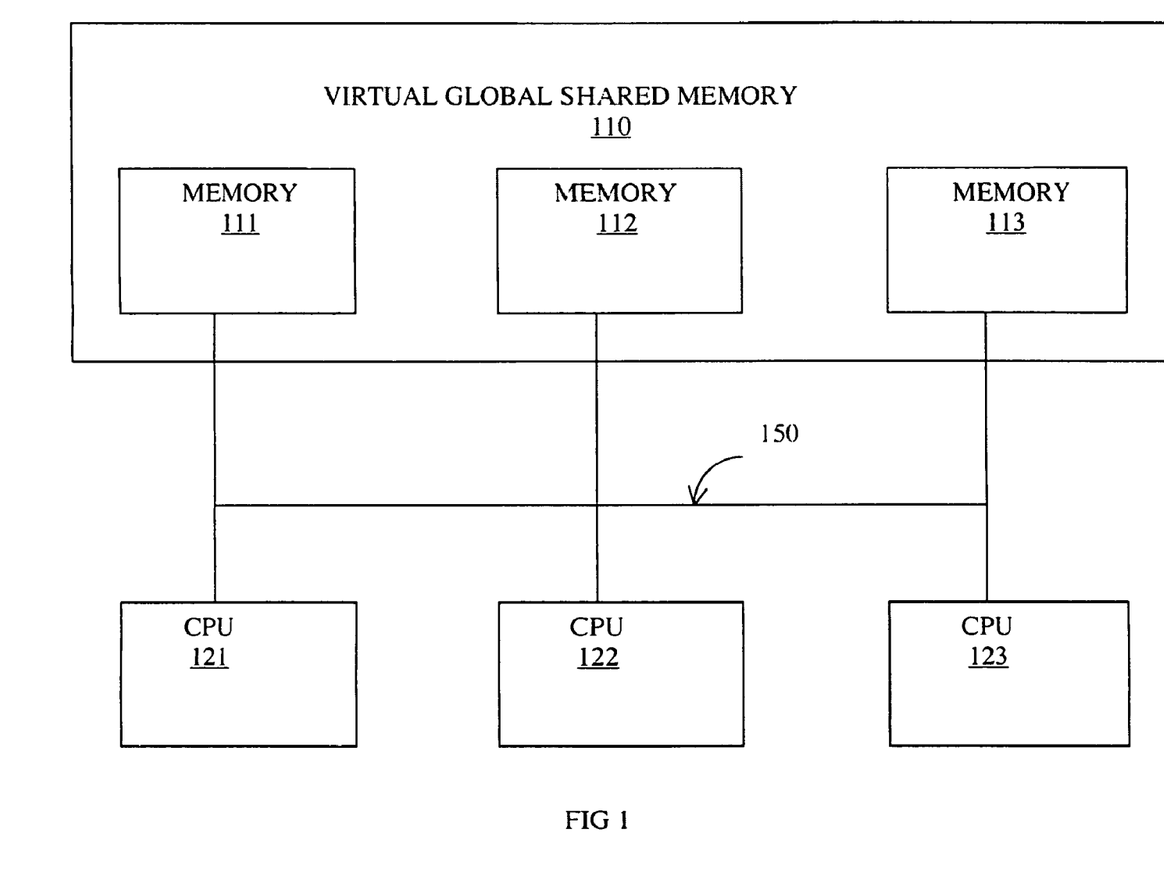
FIG. 1 is a block diagram of a unity parallel programming system in accordance with one embodiment of the present invention.

FIG. 1 is a block diagram of unity parallel processing system 100 in accordance with one embodiment of the present invention. Unity parallel processing system 100 includes bus 150, symmetric multiprocessors (SMPs) 121, 122, and 123, and memories 111, 112, and 113. Bus 150 is communicatively coupled to symmetric multiprocessors (SMPs) 121, 122, and 123, and memories 111, 112, and 113.

The components of unity parallel processing system 100 cooperatively operate to perform parallel processing of sequential programs sharing a virtual global memory space 110. Bus 150 communicates information. Symmetric multiprocessors 121, 122 and 123 run shared memory applications with modified runtime guidance directives. Memories 111, 112 and 113 store information, wherein the modified guidance runtime directives permit the plurality of memories to emulate a virtual global memory across the plurality of symmetric multiprocessors.

The runtime environment of parallel processing system 100 enables global process support across the plurality of symmetric multiprocessors and multi-thread processing within each one of the plurality of symmetric multiprocessors. Each of the plurality of memories allow for shared memory implementation with each associated one of the respective plurality of symmetric multiprocessors. Access to others of the plurality of memories is at the process level.

Each one of the plurality of the symmetric multiprocessors is communicatively coupled with a respective one of the plurality of memories to form a symmetric multiprocessor node. Each SMP node is treated as a single process with one-way communication (e.g., PUT( ), GET( ), etc.) to other SMP nodes. Each SMP node program utilizes multiple threads according to OpenMP directives and Open MP library calls. Data is portioned across multiple SMP nodes and controlled by unity compiler directives.

Figure 2:
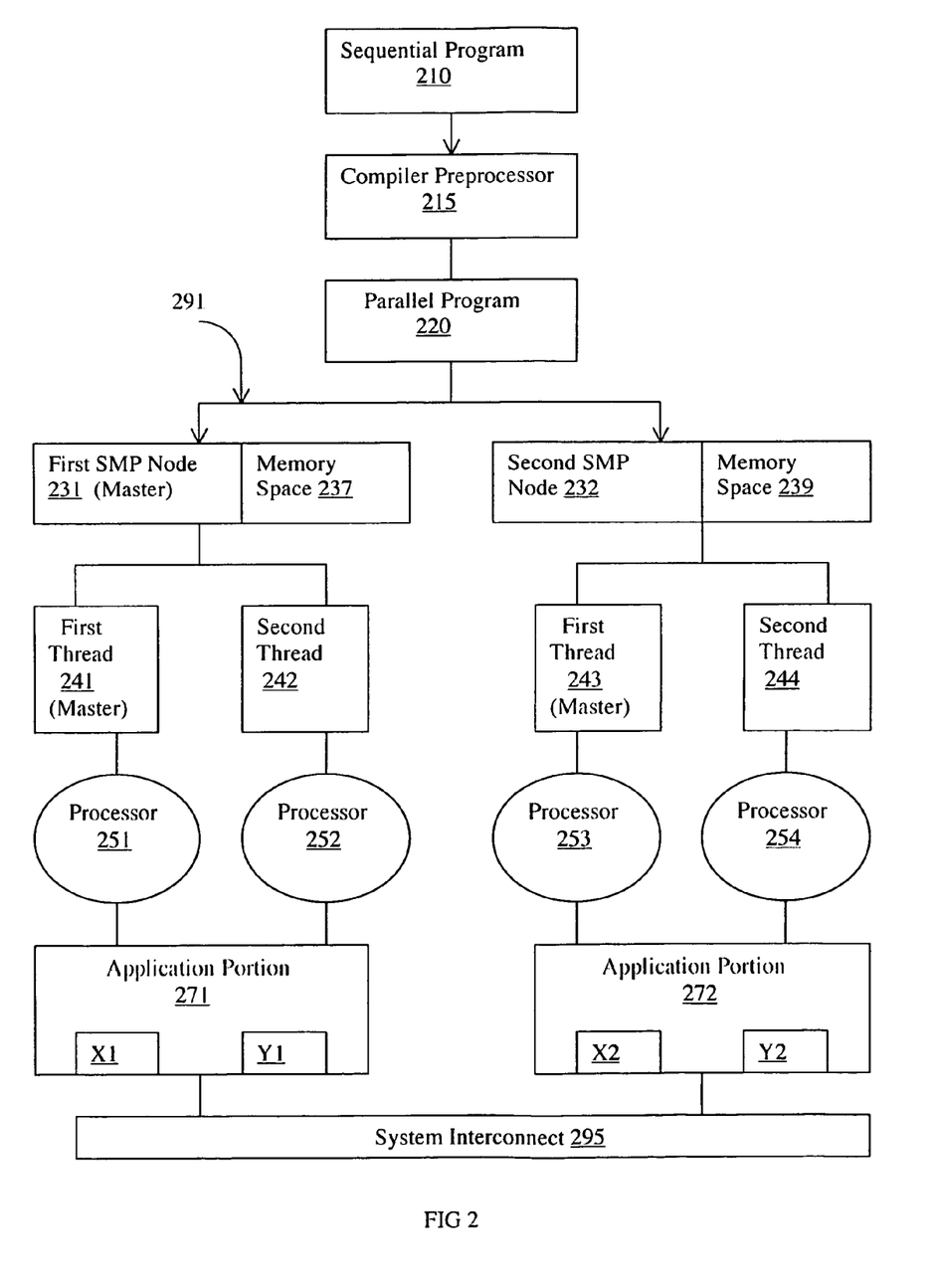
FIG. 2 is a block diagram of another unity parallel programming system in accordance with one embodiment of the present invention.

FIG. 2 is a block diagram of a unity parallel processing system 200 in accordance with one embodiment of the present invention. Unity parallel processing system 200 includes first symmetric multiprocessor 231, second symmetric multiprocessor node 232, bus 291, memory space 237 and memory space 239. Bus 291 is communicatively coupled to the first symmetric multiprocessor node 231 and the second symmetric multiprocessor node 232.

The components of unity parallel processing system 200 cooperatively operate to perform parallel processing of sequential programs sharing an emulated virtual global memory space. First symmetric multiprocessor node 231 implements a first parallel process with visibility to a virtual global memory. Second symmetric multiprocessor node 232 implements a second parallel process with visibility to a virtual global memory. Bus 291 communicates information between the first symmetric multiprocessor node and the second symmetric multiprocessor node. Process parallelism, data portioning, and data communication are used between the first symmetric multiprocessor node 231 and second symmetric multiprocessor node 232.

Each of the symmetric multiprocessor nodes includes a memory for implementing a portion of the virtual global memory. For example, first symmetric multiprocessor node 231 includes a first local memory address space 237 and second symmetric multiprocessor node 232 includes a second local memory address space 239. First local memory address space 237 and the second local memory address space 239 implement a portion of the virtual global memory.

First symmetric multiprocessor node 231 and second symmetric multiprocessor node 232 perform processing operations associated with a sequential program. For example, sequential program 210 is fed into compiler preprocessor 215 which adds directives to sequential program 210 and forwards the results as parallel program 220 to first symmetric multiprocessor node 231 and second symmetric multiprocessor node 232. The first parallel process implemented by first symmetric multiprocessor node 231 executes a portion of the instructions in sequential program 210. Similarly, the second parallel process implemented by second symmetric multiprocessor node 232 executes a portion of the instructions in sequential program 210.

In one embodiment of the present invention, portions of a plurality of threads are executed concurrently. The first parallel process executes a first set of threads (e.g., first thread 241 and second thread 242) in shared coherence address space (e.g., memory space 237) of the first symmetric multiprocessor node 231. Similarly, the second parallel process executes a second set of threads (e.g., first thread 243 and second thread 244) in shared coherence address space (e.g., memory space 239) of the second symmetric multiprocessor node 232. Portions of the first set of threads and portions of the second set of threads execute concurrently. For example, first thread 241, second thread 242, first thread 243 and second thread 244 can be executed concurrently on respective processors 251, 252, 253, and 254 respectively. First thread 241 and second thread 242 are associated with application portion 271 which includes operations X1 and Y1. First thread 243 and second thread 244 are associated with application portion 272 which includes operations X2 and Y2. System interconnect 295 cumulates the results in a virtual global shared memory.

Figure 3:
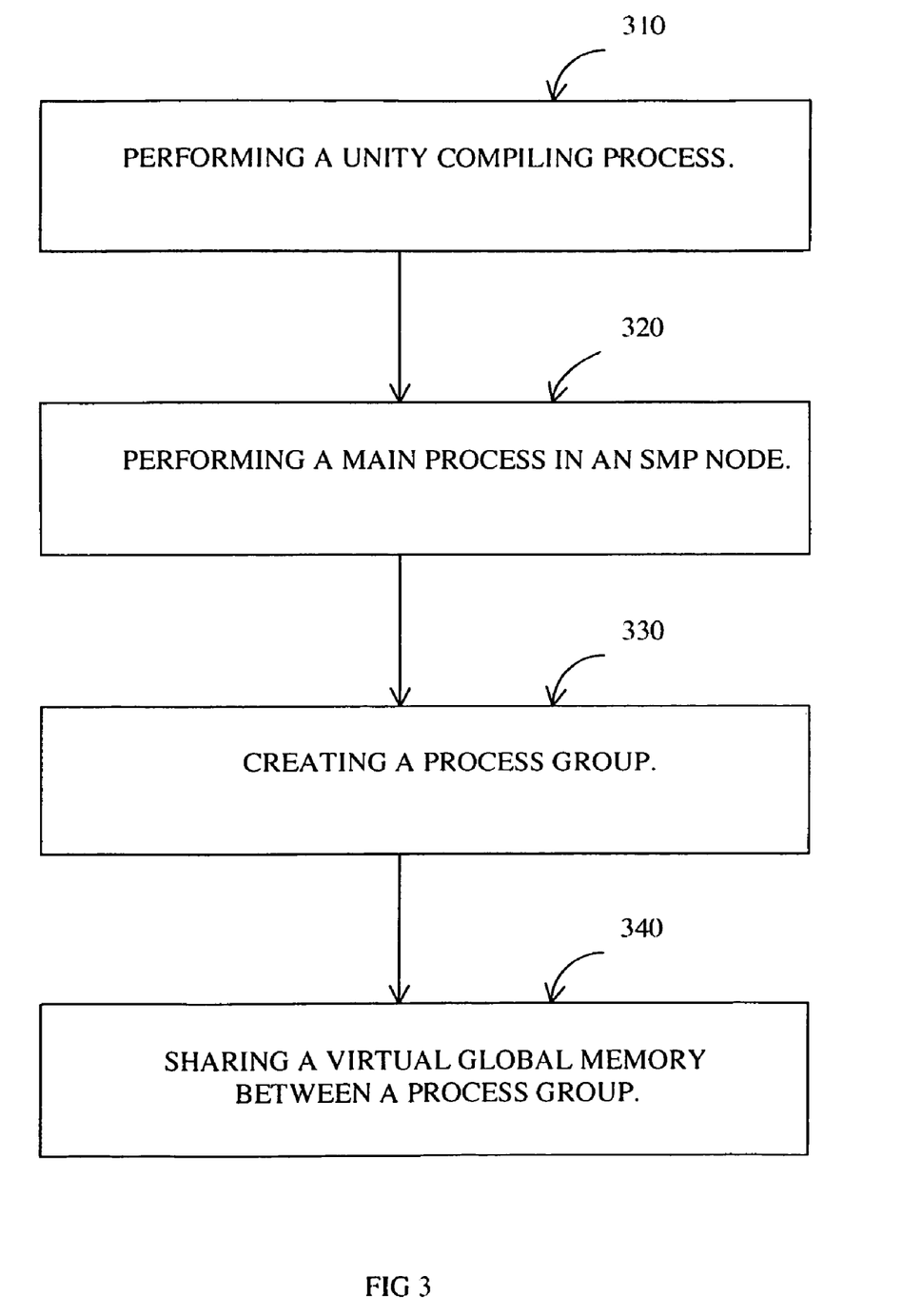
FIG. 3 is a flow chart of a unity parallel programming method in accordance with one embodiment of the present invention.

FIG. 3 is a flow chart of a unity parallel processing method 300 in accordance with one embodiment of the present invention.

In step 310, a unity compiling process is performed. In one embodiment, a shared memory program is translated and data parallel directives are added into a distributed program. The translated distributed program is compiled with an open multiprocessor compiler and the compiling results are linked with a unity run time library.

In step 320, a main process in an SMP node is performed. In one embodiment, performing a main process includes running a master thread, creating a team of threads when a parallel construct is encountered, and executing in parallel program statements enclosed in the parallel construct by treads in the team. In one exemplary OpenMP FORTRAN API implementation, the PARALLEL and END PARALLEL directives define a parallel construct. The threads are synchronized in the team when an end parallel directive is encountered. After the threads are synchronized the team is dissolved, threads of a dissolved team are entered into a wait state, and execution of a program is continued with the master thread.

In step 330, a process group is created. In one embodiment of the present invention, additional processes are dispatched to other SMP nodes (e.g., via unity virtual process support). A unity data parallel extension framework is utilized to control execution of program flows, communication and synchronization within the process group. In one exemplary implementation, a unity virtual process support is used to create the process group.

In step 340, a virtual global memory is shared between the process group. A hierarchical execution model produces a parallel node program utilizing thread parallelism expressed by means of Open MP features.

Figure 4:
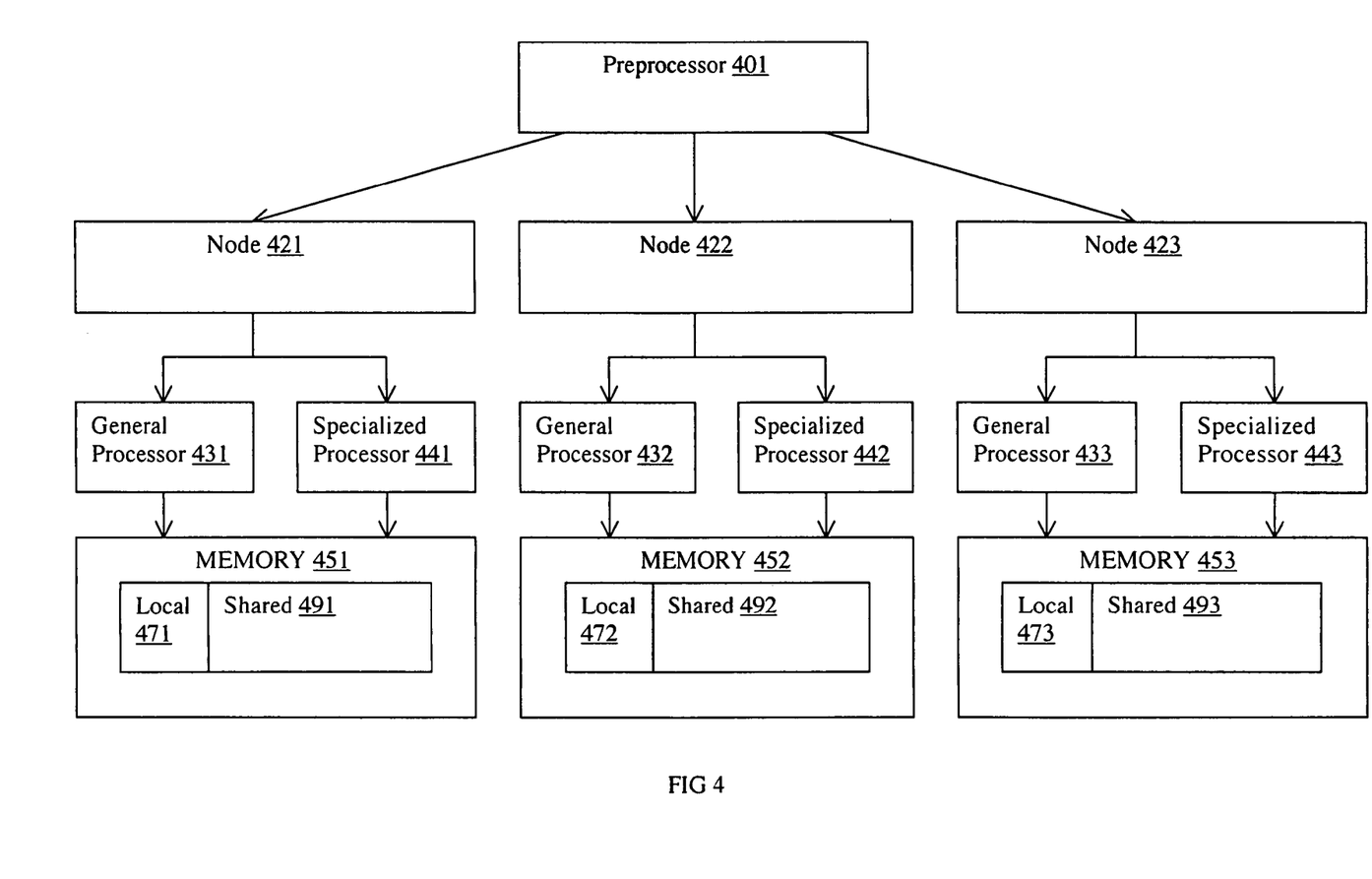
FIG. 4 is a block diagram of another exemplary unity parallel processing system in accordance with one embodiment of the present invention.

FIG. 4 is a block diagram of unity parallel processing system 400 in accordance with one embodiment of the present invention. Unity parallel processing system 400 includes preprocessor 401 that feeds a portion of an application process to nodes 421, 422 and 423. Node 421 includes general processor 431, specialized processor 441 and memory 451. Node 422 includes general processor 432, specialized processor 442 and memory 452. Node 423 includes general processor 433, specialized processor 443 and memory 452. In one exemplary implementation, memories 451, 452, and 453 include a local memory portion 471, 472 and 473 respectively and a shared memory portion 491, 492 and 493 respectively. In one exemplary implementation, shared memory within a node is also coherent.

The components of unity parallel processing system 400 cooperatively operate to enable utilization of sequential application programs in a parallel multi-processing system architecture that permits multi-thread programming within individual SMP nodes while providing global process support across multiple SMP nodes in which the multi-computers share a virtual global memory space. Preprocessor 401 splits a single application or process into symmetrical processes that operate on each respective node 421, 422 and 423, with each symmetrical process operating on different data. In one exemplary implementation, preprocessor 401 is initiated on a single processor or machine in a cluster of unity parallel processing system 400. General processors 431, 432 and 433 perform general processing operations. Specialized processors 441, 442 and 443 perform special processing operations. Memories 451, 452 and 453 store information.

Figure 5:
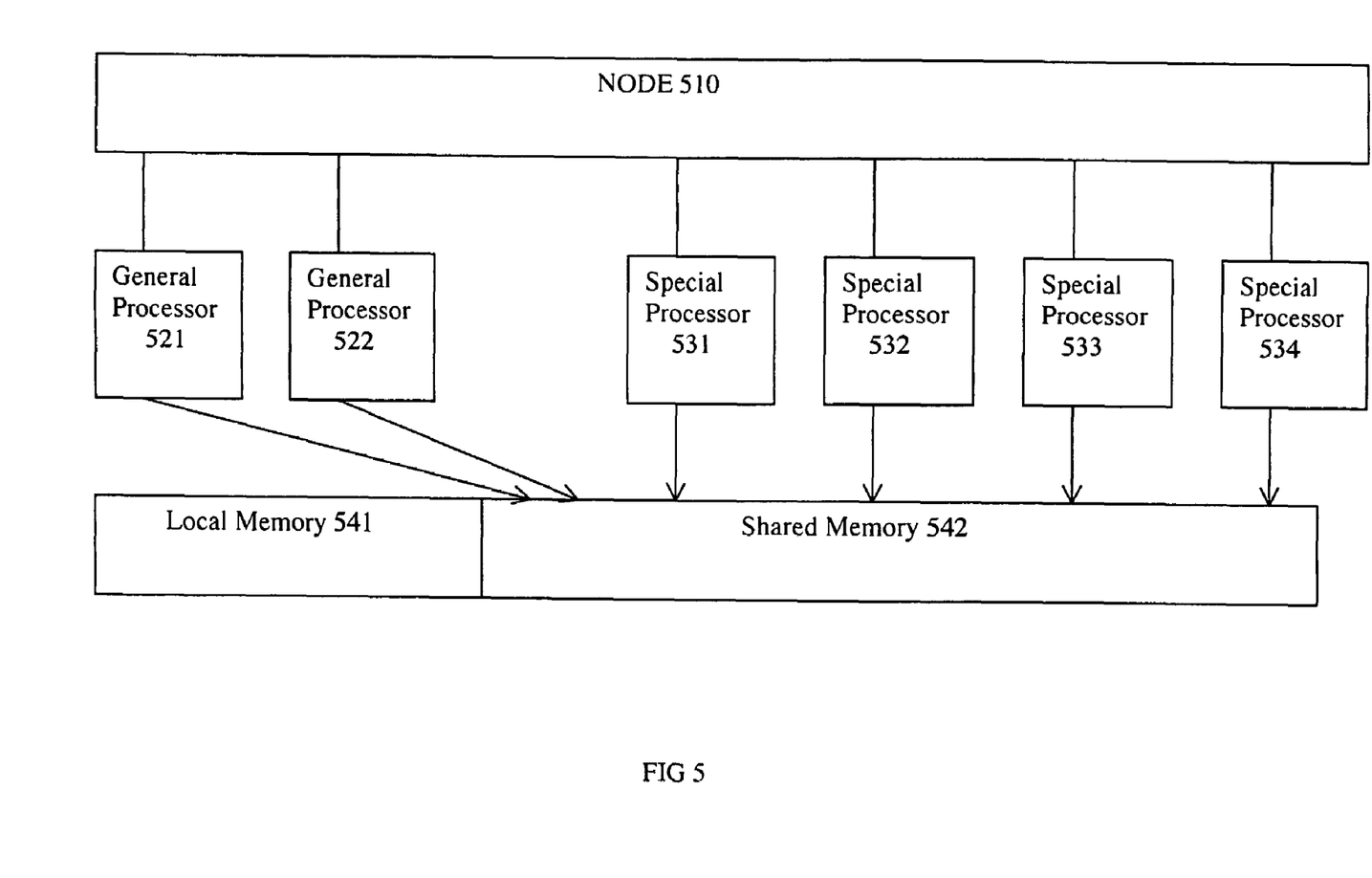
FIG. 5 is a block diagram of a node in accordance with one embodiment of the present invention.

In one embodiment of the present invention, the nodes can include a variety of variable configurations. FIG. 5 is a block diagram of node 510 in accordance with one embodiment of the present invention. Node 510 includes general processors 521 and 522, special processors 531 through 534, local memory 541 and shared memory 542. General processors 521 and 522 perform general processing operations. Specialized processors 531 through 534 perform special processing operations (e.g., floating point operations). In one embodiment of the present invention, the general processors 521 and 522 are scalar processors and special processors 531 through 534 are vector processors. In one exemplary implementation, specialize processors (e.g., 531, 532, 533 and 534) are optimized for special operations and have a number of advantageous characteristics including, less power consumption, less heat dissipation, cost less, are more dense and occupy less space than general processors (e.g., 521 and 522 respectively).

Figure 6:
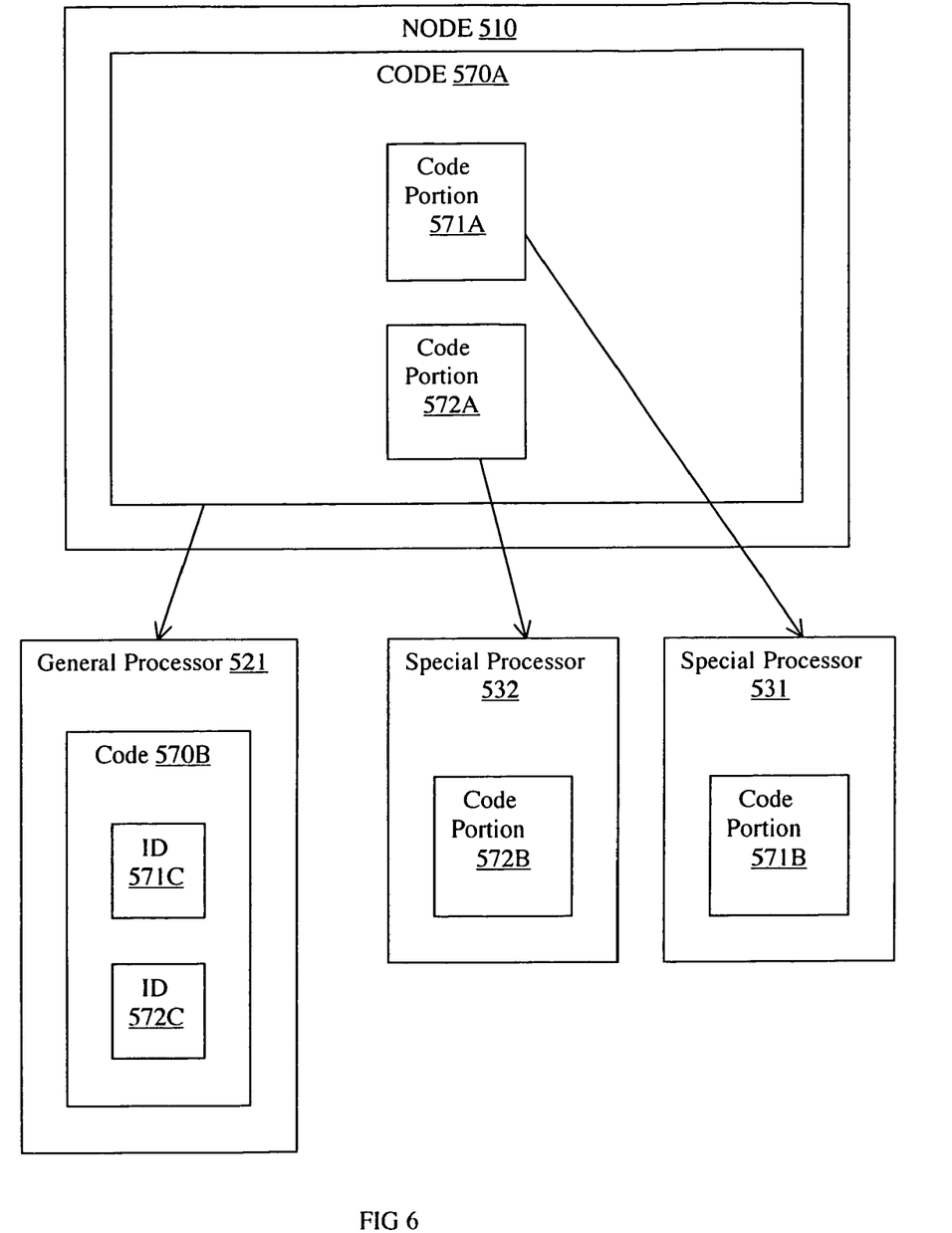
FIG. 6 is a block diagram of application program code divided up between components of a node in accordance with one embodiment of the present invention.

FIG. 6 is a block diagram of application program code divided up between components of node 510 in accordance with one embodiment of the present invention. Node 510 analyzes code 570A and identifies code portions (e.g., code portion 571A and code portion 572A) which are passed to special processors 531 and 532 (e.g., as code 571B and 572B respectively). Node 510 inserts identifiers or markers ID 571C and ID 572C in code 570A in place of code portion 571A and code portion 572A to form code 570B which is passed to general processor 521. The operations of code portions 571B and 572B are performed by special processors 531 and 532 and the results are associated with ID 571C and ID 572C for passing to general processor 521. For example, when general processor 521 is performing operations associated with code 570B and reaches ID 571 it retrieves the results of code portion 571B operations performed by special processor 531. In one exemplary implementation, special processors 531 and 532 store the results of code portions 571B and 572B in shared memory 542 and general processor 521 retrieves the results form shared memory 542. The division and allocation of code portions to the special processors can be implemented as part of a preprocessing or compile operation. The division and allocation of code portions can also be implemented at run time. It is appreciated that code within a general processor can be divided into multiple threads and the threads executed by a respective special processor.

Figure 7:
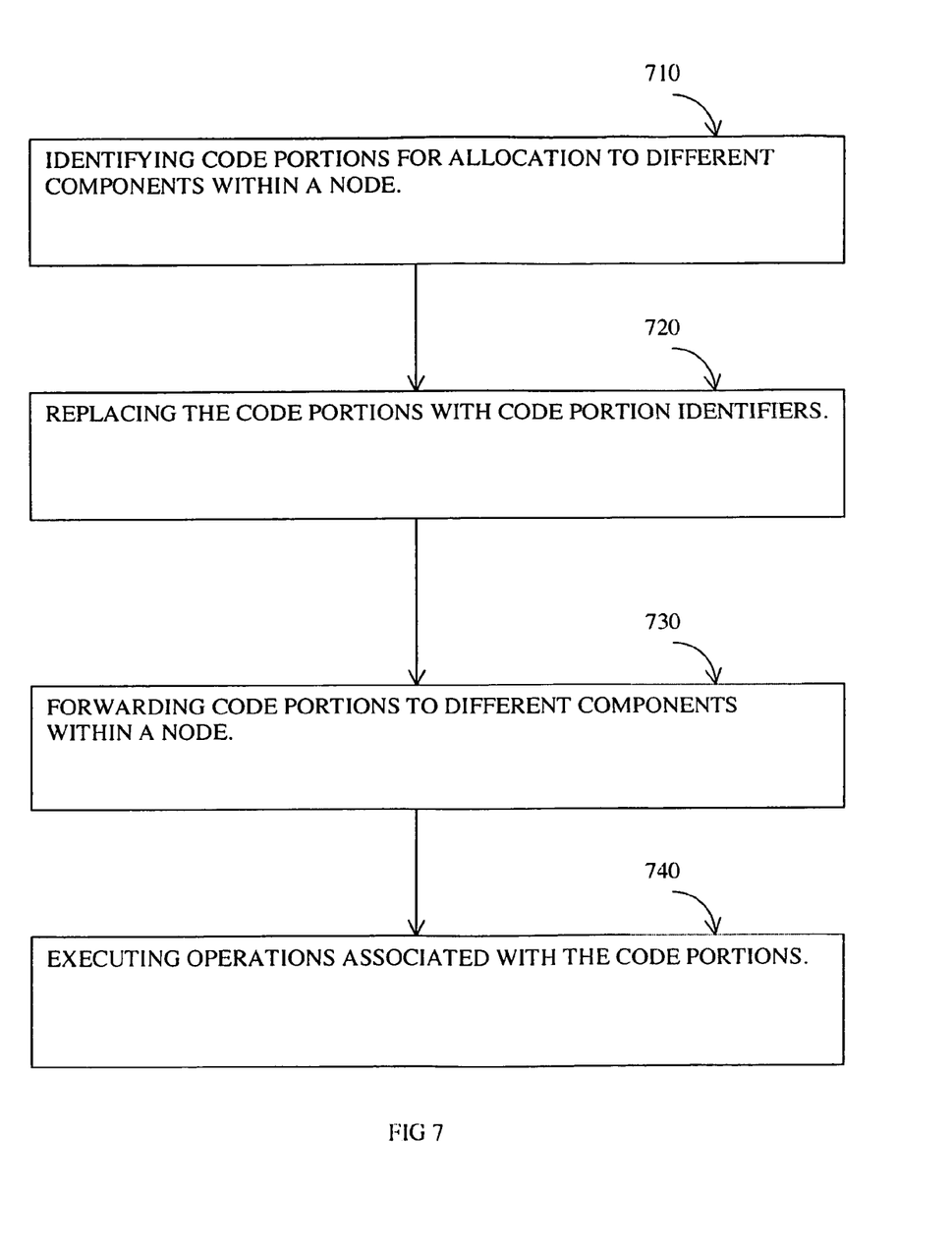
FIG. 7 is a flow chart of a code allocation method in accordance with one embodiment of the present invention.

FIG. 7 is a flow chart of code allocation method 700 in accordance with one embodiment of the present invention. In one embodiment of the present invention, code allocation method 700 allocates application program code between components within a node.

In step 710, code portions for allocation to different components within a node are identified. In one embodiment of the present invention, code portions associated with special operations are identified and allocated to corresponding special processors. For example, special operations are allocated by vector processors. In one exemplary implementation, code portions associated with asynchronous operations are identified and allocated to other processors within the node for execution.

In step 720, the identified code portions are replaced by code portion identifiers in the main code section. In one embodiment of the present invention, the code portion identifier is a marker that identifies the code section or portion extracted during replacement. The code identifier can also indicate a memory location for storing the results of the extracted code operations.

In step 730, the code portions and code portion identifiers are forwarded to different components within the node in accordance with the identified allocation in step 710. In one embodiment, code portions are forwarded to other processors (e.g., special processors) within the node for execution.

In step 740, components within the node execute the operations associated with the code portions. The node components perform instructions in the allocated code portion or section and store the results in a memory location. For example a memory location indicted by the code portion identifier or marker. In one embodiment, when the node component executing the main code portion or section encounters the code identifier or marker, the node component waits for the synchronization lock release. After the synchronization lock release the node component executing the main code section fetches the information (e.g., from a memory location indicated by the marker).

In one embodiment of the present invention, the configuration of the processors within a node can be altered. For example, the ratio of special processors to general processors can be changed. In one embodiment, a present invention system and method includes embodiments of systems and methods described in concurrent patent application entitled "Dynamically Configurable Symmetric Multi-Processors", U.S. patent application Ser. No. 10/977,214 filed on Oct. 29, 2004, which is incorporated herein by this reference.

In one embodiment of the present invention, unity parallel processing systems and methods of the present invention include prefetch processing systems and methods. In one embodiment, a present invention system and method includes embodiments of pre-fetch processing systems and methods described in concurrent provisional patent application entitled "A Pre-fetch Processing Redistribution System and Method", U.S. Provisional patent application Ser. No. 11/035,641 filed on Nov. 4, 2004, which is incorporated herein by this reference.

Thus, a present invention unity parallel processing system and method facilitates flexible utilization of sequential program applications in a distributed multi-computer parallel processing environment. The new present invention unity parallel processing architecture enables multiple processing nodes (e.g., SMPs) to perform multi-thread programming within each of the multiple processing nodes while providing a shared virtual global memory space and supporting global processing across the multiple processing nodes. In one embodiment, the present invention allows realization of both SMP System and distributed memory cluster efficiencies concurrently. For example, embodiments of the present invention can be implemented in systems with less total memory than would otherwise be required in traditional distributed-memory parallel approaches. For example, replicated data arrays can be allocated once per node while conventional approaches have to be allocated by each process resulting in multiple copies on each node. The present invention also facilitates incremental increases in parallelism, ease of programming, maintainability and debuggability. Data movements between nodes can also be reduced by present invention access to non-local data at the process level.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various modifications as are suited to the particular use contemplated. It is intended that the scope of the invention be defined by the Claims appended hereto and their equivalents.

What is claimed is:

1. A unity parallel processing system comprising:
 a plurality of symmetric multiprocessors for running shared memory applications with modified runtime guidance directives, wherein said plurality of symmetric multiprocessors execute a code allocation method, wherein the code allocation method comprises:
  identifying code portions for allocation to different components within a node:
  replacing the identified code portions by code portion identifiers in a main code section;
  forwarding the code portions and code portion identifiers to different components within the node in accordance with the identified allocation; and
  executing the operations associated with the code portions on identified components within the node;
a plurality of memories for storing information, wherein the modified guidance runtime directives permit the plurality of memories to emulate a virtual global memory across the plurality of symmetric multiprocessors; and
a bus for communicating information, the bus communicatively coupled to said plurality of symmetric multiprocessors and the plurality of memories.

2. The unity parallel processing system of claim 1 wherein a runtime environment enables global process support across the plurality of symmetric multiprocessors and multi-thread processing within each one of the plurality of symmetric multiprocessors.

3. The unity parallel processing system of claim 1 wherein each of the plurality of memories allow for implementation of a virtual global shared memory implementation across the plurality of memories at a process level.

4. The unity parallel processing system of claim 1 wherein each one of the plurality of the symmetric multiprocessors is communicatively coupled with a respective one of the plurality of memories to form symmetric multiprocessor nodes.

5. The unity parallel processing system of claim 4 wherein each symmetric multiprocessor node is treated as a single process with one-way communication to other symmetric multiprocessor nodes.

6. The unity parallel processing system of claim 5 wherein each symmetric multiprocessor node program utilizes multiple threads according to OpenMP directives and Open MP library calls.

7. The unity parallel processing system of claim 4 wherein data is portioned across multiple symmetric multiprocessor nodes and controlled by unity compiler directives.

8. The unity parallel processing system of claim 1 wherein access to said memories is at the process level.

9. A unity parallel processing system comprising:
  a plurality of symmetric multiprocessor nodes, including a:
  a first symmetric multiprocessor node for implementing a first parallel process with visibility to a virtual global memory; and
  a second symmetric multiprocessor node for implementing a second parallel process with visibility to the virtual global memory, wherein said first and second symmetric multiprocessor nodes participate in a code allocation method, wherein the code allocation method comprises:
    identifying code portions for allocation to different components within a node;
    replacing the identified code portions by code portion identifiers in a main code section;
    forwarding the code portions and code portion identifiers to different components within the node in accordance with the identified allocation; and
    executing the operations associated with the code portions on identified components within the node; and
  a bus for communicating information between the first symmetric multiprocessor node and the second symmetric multiprocessor node, the bus communicatively coupled to the first symmetric multiprocessor node and the second symmetric multiprocessor node.

10. The unity parallel processing system of claim 9 wherein the first symmetric multiprocessor node includes a first local address space and the second symmetric multiprocessor node includes a second local address space, wherein the first local address space and the second local address space implement a portion of the virtual global memory.

11. The unity parallel processing system of claim 9 wherein the first parallel process and the second parallel process execute a program.

12. The unity parallel processing system of claim 9 wherein the first parallel process executes a first set of threads in shared coherence address space of the first symmetric multiprocessor node and the second parallel process executes a second set of threads in shared coherence address space of the second symmetric multiprocessor node, wherein portions of the first set of threads and portions of the second set of threads execute concurrently.

13. The unity parallel processing system of claim 9 wherein process parallelism, data portioning, and data communication are implemented by the first symmetric multiprocessor node and second symmetric multiprocessor node.

14. The unity parallel processing system of claim 9 wherein performing a main process comprises running a master thread.

15. The unity parallel processing system of claim 9 wherein the code portions associated with special operations are identified and forwarded to corresponding special processors.

16. The unity parallel processing system of claim 9 wherein the code portions associated with asynchronous operations are identified and allocated to processors within the first symmetric multiprocessor node and the second symmetric multiprocessor node for execution.

17. The code allocation method of claim 16 wherein the code identifier also indicates a memory location for storing the results of the extracted code operations.

18. The code allocation method of claim 16 wherein a node component executing the main code portion is a general processor.

19. The code allocation method of claim 16 wherein a node component executing the main code portion encounters the code identifier or marker, waits for a synchronization lock release, and fetches the information from a memory location indicated by the marker.

20. The unity parallel processing system of claim 9 wherein the code portions are replaced by code portion identifiers in the main code section, wherein said code portion identifiers identify the code section or portion extracted during replacement.

* * * * *